US008245548B2

(12) United States Patent
Sibley et al.

(10) Patent No.: US 8,245,548 B2
(45) Date of Patent: Aug. 21, 2012

(54) HANDLE ASSEMBLY

(75) Inventors: Paul Sibley, Shefford (GB); Phillip Taylor, Shefford (GB); Simon Keane, Albans (GB)

(73) Assignee: GM Global Technology Operations LLC, Detroit, MI (US)

( * ) Notice: Subject to any disclaimer, the term of this patent is extended or adjusted under 35 U.S.C. 154(b) by 933 days.

(21) Appl. No.: 12/263,009

(22) Filed: Oct. 31, 2008

(65) Prior Publication Data

US 2009/0119880 A1 May 14, 2009

(30) Foreign Application Priority Data

Nov. 2, 2007 (EP) .................................... 07021381

(51) Int. Cl.
*B60R 25/02* (2006.01)

(52) U.S. Cl. ................ 70/208; 70/224; 70/257; 70/275; 292/336.3

(58) Field of Classification Search .................... 70/208, 70/224, 275, 257; 292/336.3, DIG. 42
See application file for complete search history.

(56) References Cited

U.S. PATENT DOCUMENTS 2,772,809 A * 12/1956 Ross ............................ 220/318
4,157,844 A * 6/1979 Sarosy et al. ................... 292/48
5,722,703 A * 3/1998 Iwamoto et al. .................. 292/1
5,913,908 A 6/1999 Czipri
RE36,694 E * 5/2000 McFarland ................. 292/336.3
6,293,130 B1 * 9/2001 Ramsauer ........................... 70/2
6,357,268 B1 * 3/2002 Takimoto ........................ 70/208
6,427,501 B2 * 8/2002 Ramsauer ....................... 70/208
6,698,262 B2 * 3/2004 Wittwer .......................... 70/208
7,108,301 B2 * 9/2006 Louvel ....................... 292/336.3
7,599,721 B2 * 10/2009 Taki et al. .................. 455/575.1
7,681,424 B2 * 3/2010 Antonucci ...................... 70/208
2005/0057047 A1 * 3/2005 Kachouh et al. .............. 292/201

FOREIGN PATENT DOCUMENTS

DE 19740523 A1 3/1999
DE 10309821 A1 9/2004
EP 1099810 A1 * 5/2001

* cited by examiner

*Primary Examiner* — Suzanne Barrett
*Assistant Examiner* — Ifeolu Adeboyejo
(74) *Attorney, Agent, or Firm* — Ingrassia Fisher & Lorenz, P.C.

(57) ABSTRACT

A handle assembly, includes, but is not limited to a handle on one side of a vehicle tailgate liftglass. The handle is connected to a shaft member that passes through a hole in the liftglass. A motor pivots the assembly into either a closed position, in which the handle lies adjacent to the liftglass, or an open position, FIG. 2, in which a gap is left between the handle and the liftglass into which the user may place his hand in order to pull the handle or push the liftglass. Preferably there is a resilient element between the motor and the handle.

14 Claims, 2 Drawing Sheets

HANDLE ASSEMBLY

CROSS-REFERENCE TO RELATED APPLICATION

This application claims priority to European Patent Application No. 07021381.4, filed Nov. 2, 2007, which is incorporated herein by reference in its entirety.

TECHNICAL FIELD

The present invention relates to handle assemblies, and more particularly to a handle assembly for a flap member such as a door or window, especially for vehicles.

BACKGROUND

Vehicles are regularly exposed to the effects of the weather as they are being driven or while they are parked on driveways or streets. In addition, the back of the vehicle is subject to exhaust fumes rising from the exhaust pipe and to spray and dirt that is thrown up from the wheels. The result is inevitably that within a very short time of the vehicle being cleaned, the back of the vehicle becomes dirty to touch.

Many vehicles have tailgates, which are doors or gates at the rear which are hinged at the top. The accumulating dirt is particularly inconvenient where the tailgate has a liftglass, which is an opening section of window which is hinged at the top. These usually have external handles and the user is required to dirty his hands both when pulling the handle to open the liftglass, and when pushing the glass to close it again.

Aspects of the present invention seek to overcome or reduce one or more of the above disadvantages.

SUMMARY

According to an aspect of the invention, there is provided a handle assembly that includes, but is not limited to a handle arranged to be located on one side of a barrier member and having fixed thereto to at least one shaft member arranged to pass through a respective hole in the barrier member, the handle being arranged to pivot between a closed position, in which the handle is adjacent to the barrier member, and an open position, in which there is a gap between the handle and the barrier member; wherein the handle assembly is provided with a motor which is arranged to move the shaft member so as to move the handle assembly between the closed position and the open position. This enables a user to operate a handle without dirtying his hands on surfaces which are normally exposed to the weather or contaminants.

Preferably, there is a resilient element between the handle and the motor. This provides some play in the relative movement of the handle and the drive train, protecting trapped fingers from injury or protecting components from damage that might otherwise be caused by the handle being vigorously pushed closed or pulled open.

Preferably, the resilient element is a plate spring connected to two side arms. The side arms are connected by splines to a spindle which is driven by the motor. The splines allow the spindle to rotate the side arms while leaving the inner plate only loosely mounted.

Preferably the plate spring is loosely connected to each side arm at its end remote from the spindle. This allows relative movement between the plate spring and the side arms, facilitating assembly and preventing any binding between them.

Preferably, the handle assembly is arranged to pivot the handle about an axis parallel to the spindle.

Preferably, the motor is operated in response to a signal from a short range proximity sensor. This means that the user is not required to take any action to open the handle assembly other than approach it, making the assembly clear and straightforward to use.

Preferably, the inner plate and the handle are connected through the hole by a shaft member which is surrounded in the hole by a flexible grommet. The flexible grommet allows the shaft member the movement required to allow the handle to pivot while maintaining a water-tight seal.

According to a further aspect of the invention, there is provided a tailgate liftglass for a vehicle including a handle assembly as previously set forth.

According to a further aspect of the invention, there is provided a vehicle with a tailgate liftglass for a vehicle including a hand assembly as previously set forth.

BRIEF DESCRIPTION OF THE DRAWINGS

The present invention will hereinafter be described in conjunction with the following drawing figures, wherein like numerals denote like elements, and.

DETAILED DESCRIPTION

Figure 2:
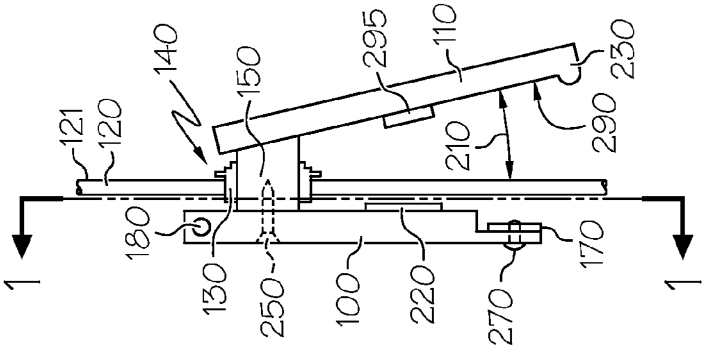
FIG. 2 is a side sectional view of the embodiment of FIG. 1.
Figure 1:
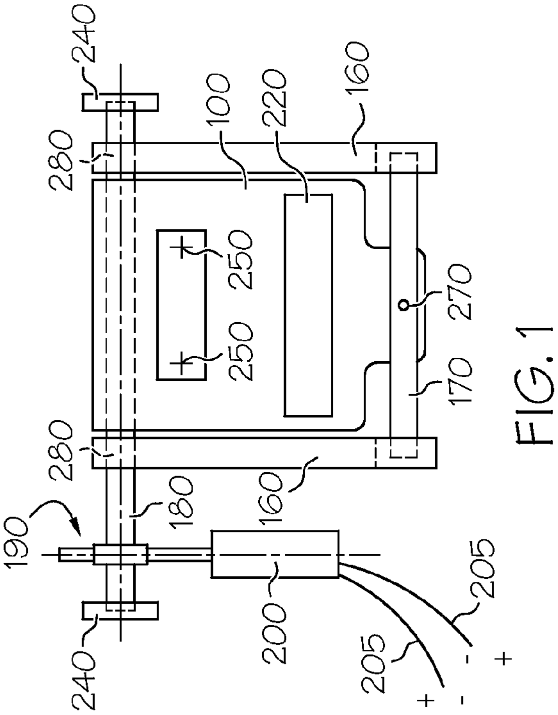
FIG. 1 is a part sectional view of a handle assembly according to a first embodiment of the invention, the section is taken along the line AA of FIG. 2.
Figure 3:
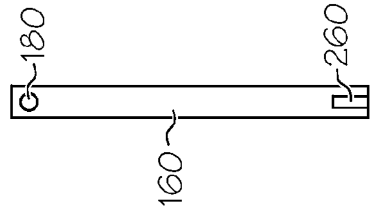
FIG. 3 is a side view of a side arm of the embodiment of FIG. 1 and FIG. 2.

With reference to FIG. 1, FIG. 2, and FIG. 3, an embodiment of the handle assembly comprises an inner plate 100 and a handle 110. Suitable dimensions for the handle are 80 mm wide, 80 mm long and 10 mm thick. The inner plate 100 and the handle 110 are disposed at opposite sides of a liftglass 120 of a vehicle tailgate (not shown) with the handle 110 external to the vehicle. The inner plate 100 and the handle 110 are rigidly connected to each other through a hole 140 in the glass 120 by a shaft member 150. The shaft member 150 is formed integrally with the handle 110 and is connected to the inner plate 100 by screws 250 in the inner plate 100. The shaft member 150 is surrounded in the hole 140 by a flexible grommet 130 to allow the shaft member 150 to move within the hole 140 while maintaining a water-tight seal.

The inner plate 100, the handle 110 and the shaft member 150 are arranged so that together they may pivot between a closed position, in which the handle 110 lies adjacent to the glass 120, and an open position, FIG. 2, in which there is a gap 210 between the handle 110 and the glass 120. Gap 210 is sufficient to enable a user to place his hand between the handle 110 and the glass 120. The positions of the inner plate 100' and handle 110' in the closed position are schematically shown in FIG. 2.

The inner plate 100 is situated between two side arms 160. The side arms 160, as shown in FIG. 3, are provided with a groove 260 in one end into which is inserted a plate spring 170. Plate spring 170 passes between the two side arms 160, and passes across and is secured to the inner plate 100 by a rivet 270. Inner plate 100 is narrower in this area to allow the plate spring 170 to flex.

The inner plate 100 is further provided with a resilient bumper 220 on the surface closer to the glass 120. This spreads the force on the glass 120 when the user pulls the handle 110 to prevent too much stress on the pivot. Also, if when moving from the closed position to the open position, the inner plate 100 travels too far, the bumper 220 gently dampens the impact of the inner plate 100 on the glass 120.

In addition, the handle 110 is provided with a lip 230. The lip 230 covers the lower edge 122 of the glass 120 when the handle 110 is in the closed position and thereby serves as an extra seal to help prevent water and dirt from reaching the surfaces protected by the handle 110.

A spindle 180 is held between bearings 240 and passes through the side arms 160 and the inner plate 100 to act as the axis about which the inner plate 100 and handle 110 rotate. The spindle 180 has splines 280 where it passes through the side arms 160 so that they are constrained to turn with the spindle 180. However, the spindle 180 is free to rotate within the inner plate 100.

To one side of the inner plate 100, the spindle 180 is provided with a worm and wheel drive 190. The wheel of the worm and wheel drive 190 is mounted on the spindle 180 and the worm to which it is meshed is mounted on an axle which is driven by a motor 200.

The motor 200 is arranged to be activated in response to a signal from the electronics of the vehicle. This is produced in response to a signal from a short range proximity sensor 295 incorporated into the outer surface 290 of the handle 110. The short range proximity sensor 295 detects the presence of a hand of the user. The short range proximity sensor 295 is connected to the electronics of the vehicle via wires 297 passing through suitable passages in the handle 110, shaft member 150 and inner plate 100 as necessary. The short range proximity sensor also provides a signal to unlatch the liftglass itself.

In addition, the glass-facing surface 298 of the handle 110 is provided in a soft material for a comfortable feel, improved dirt resistance and to gently dampen the impact of the handle 110 on the glass 120.

The motor 200 and bearings 240 are fixed to a base plate (not shown) which is secured to the glass 120. The motor is connected to the electronics of the vehicle via wires 205.

The operation of the handle assembly will now be described.

The default position for the assembly is the closed position. For example, when the vehicle is locked or in motion, the assembly is in the closed position, allowing the dirt and grime to accumulate only over the external surface of the handle 110 and the exposed surface 121 of the glass 120.

When a user places his hand near to the short range proximity sensor 295, it detects his presence and communicates a signal to the vehicle electronics. The vehicle electronics then communicates a signal to the motor 200 and the liftglass latch unit (not shown).

The motor 200 rotates the axle and thereby the worm of the worm and wheel 190, causing the spindle 180 to rotate. The rotation of the spindle 180 causes the side arms 160, which are connected to the spindle 180 by the splines 280, to rotate with the spindle 180.

As the side arms 160 move in unison, the plate spring 170 causes the inner plate 100 to rotate about the spindle 180. As the inner plate 100 advances towards the glass 120, the handle 110 moves away from the glass 120 until the assembly is in the open position, with the gap 210 formed between the handle 110 and the glass 120. Upon reaching this position, the motor 200, which has been preprogrammed with the displacement required, stops turning the axle.

When the assembly is in the open position, the user is able to place his hand between the glass 120 and the handle 110 and pull against the clean glass-facing surface 298 of the handle 110 to open the liftglass. To close the liftglass again, he is able again to place his hand between the glass 120 and the handle 110 and push against the clean glass that is normally covered by the handle 110.

The assembly may be returned to the closed position following a signal from the vehicle electronics; the signal may be generated automatically in response to the vehicle being locked, the engine being started or possibly if the assembly has been in the open position for a certain length of time.

In response to the closing signal, the motor 200 will be caused to rotate in the opposite sense. This will move the side arms 160 away from the glass 120, pulling the handle 110 towards the glass 120 until the handle 110 lies adjacent to the glass 120.

There are many advantages to the embodiment just described.

By providing a handle that is adapted to lift itself clear of the glass 120, the assembly enables the user to open the liftglass using the clean glass-facing surface 298 of the handle 110, and to close it using a clean section of glass. He is thereby able to operate the liftglass without having to touch any surface which is normally exposed to the effects of the weather. Consequently, the user will be able to operate the liftglass without the dirt and grime that gathers so quickly on the back of vehicles, being deposited onto his hands.

The fact that the spindle 180 and shaft member 150 are located above the main part of the handle 110 facilitates opening, since the user is not required to contort his arm as the liftglass is raised.

In addition, the handle assembly is clear to use and does not require a complex instruction book or for the user to be familiar with the vehicle. By providing a short range proximity sensor to cause the deployment of the handle assembly when the user moves his hand near to it, the user does not even have to touch the vehicle in order for the handle to be deployed.

The fact that the inner plate 100 is not rigidly attached to the spindle 180, but is connected indirectly by a plate spring 170 attached to two side arms 160, provides further advantages. If the assembly is moved from the open position to the closed position while the user's hand is placed between the handle 110 and the glass 120, the plate spring 170 provides sufficient play to prevent injury. That is that the resilience or elasticity of the plate spring 170 allows some relative movement between the side arms 160 and the inner plate 100. Furthermore, if the handle 110 is pushed or pulled so as to cause the assembly to move, the plate spring 170 relieves the force on the spindle 180 to prevent damage to the components.

By providing an assembly which may be lifted clear of the surface by an internal driving mechanism, the handle 110 can normally lie substantially flush with the liftglass 120, reducing aerodynamic resistance.

Various modifications may be made to the embodiment described.

The inner plate 100 can be omitted. However, there is preferably still a resilient element between the drive train and the handle 110 to allow some play between them.

The short range proximity sensor 295 can be incorporated into the bottom surface 296 of the handle 110 rather than the outer surface 290. This enables the handle 110 to reduce its profile further, leaving a smoother finish to the closed liftglass.

Alternatively, instead of providing a short range proximity sensor, the handle assembly can be deployed in response to the reception of a signal from a user's key or key remote. Alternatively, there can be a button for the purpose within the vehicle interior. These can generate a specific signal, for example from a 'release liftglass handle' button, or the specific signal can be generated in response to a more general signal such as one for unlocking all the doors.

The handle 110 can be provided without a lip 230. This allows the handle 110 to lie more closely against the glass 120.

The motor 200 can be connected to the spindle 180 by gear wheels or another convenient drive mechanism instead of by a worm and wheel drive 190. Alternatively, the motor can drive the spindle 180 directly.

Where there is an inner plate 100, the handle 110 and inner plate 100 can be connected through a single hole or through several holes each of which has a shaft member 150 sealed with a flexible grommet 130.

Although this embodiment describes two side arms 160 being joined by a plate spring 170 which is also connected to the inner plate 100, inner plate 100 can be resiliently connected to spindle 180 in other ways. For example, a secondary plate can be placed on the opposite side of inner plate 100 to the shaft member 150. The secondary plate and inner plate 100 can be connected by springs. Alternatively, the inner plate 100 can be fixed to the spindle 180 for example by splines, and the inner plate 100 can be resiliently connected to the handle 110. For example, the shaft member 150 can be compressible.

The shaft member 150 may be formed as a separate unit to be attached to both the handle 110 and the inner plate 100.

The assembly can be used for the tailgate itself rather than just for the liftglass, in which case the shaft member 150 passes through a metal panel instead of the rear window.

In addition, the assembly can be used for the side doors, petrol cap, bonnet, sunroof or other door or gate on the vehicle. Each of the assemblies on a vehicle can be activated by its own short range proximity sensor, or they can be opened and closed together in response to a single signal.

The spindle 180 and shaft member 150 can be provided in different arrangements according to different requirements. For example, for a side door, it may be preferable to provide a vertical spindle, whereas for a tailgate which folds down rather than up, it may be preferable to provide the spindle 180 and shaft member 150 below the main part of the handle 110.

The assembly can also be applied to a variety of doors, hatches or gates of various materials and for various purposes. Furthermore, the assembly can be used on the walls of crates or other containers that are often dirty to serve as handles for pulling or carrying rather than necessarily for opening.

The assembly can be applied to drawers in furniture whose surfaces are exposed to hazardous materials such as radioactive material or biohazards.

Figure 5:
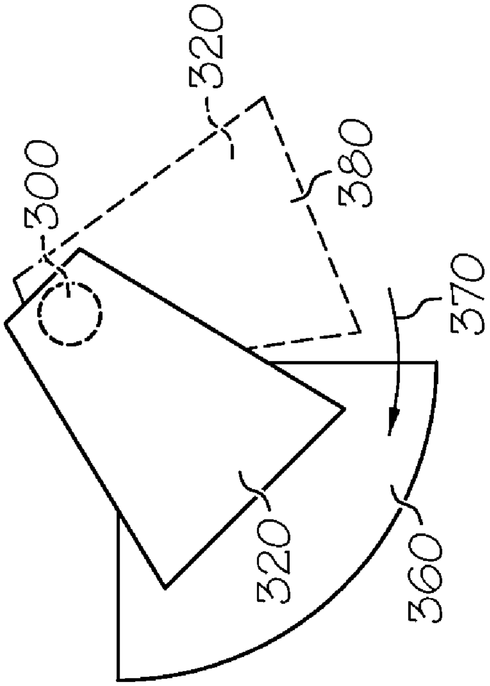
FIG. 5 is a plan view of the embodiment of FIG. 4.
Figure 4:
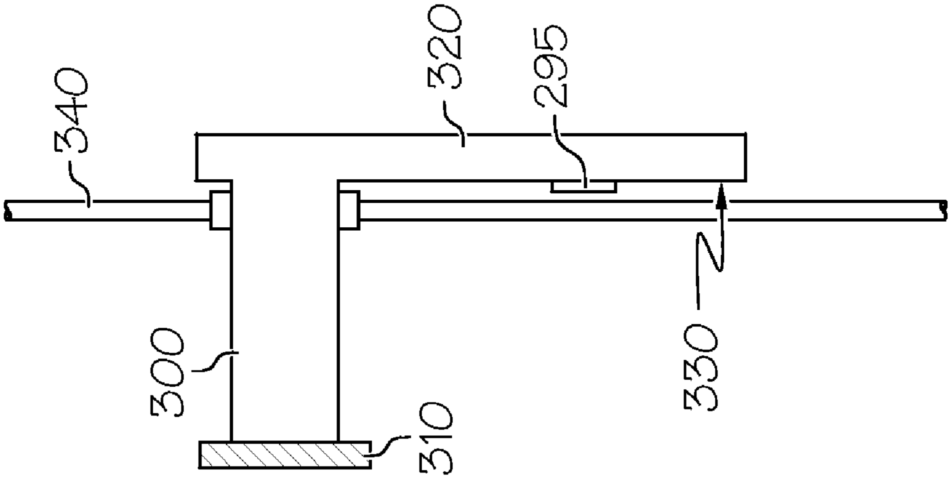
FIG. 4 is a sectional view of a handle assembly according to a second embodiment of the invention.

In a second embodiment, FIG. 4 and FIG. 5, the assembly can be arranged so that, instead of pivoting about an axis parallel to a barrier member 340, the handle 320 pivots about a shaft member 300 that is perpendicular to the barrier member 340.

Shaft member 300 passes through a hole in the barrier member 340. Behind the barrier member 340 the shaft member 300 is provided with a gear 310 which is connected to the motor 200.

To open the assembly, the shaft member 300 is rotated by the motor 200 which rotates the handle 320 in the direction of arrow 370 to be over a recess 360 in the barrier member 340. This enables the user to access the clean inside surface 330 of the handle 320 to pull the barrier member 340, and the clean normally covered surface 380 of the barrier member 340 to push the barrier member 340.

The reverse operation is performed to close the assembly again.

Again the motor is activated by a short range proximity sensor 295 which is connected by wires 297 to the vehicle electronics. This short range proximity sensor 295 is placed on the outer surface 325 of the handle 320. However, it can alternatively be placed on the bottom surface 326 of the handle 320.

This embodiment is particularly suitable where a recess may easily be provided in the barrier member 340, such as for a side door or the tailgate itself rather than a liftglass.

This embodiment can also be provided with an inner plate to facilitate securing the assembly to the barrier member 340 and to provide a bumper to spread the force of the user pulling on the handle 320.

There can also be a resilient element between the motor 200 and the handle 320.

Features of the above embodiments may be combined or interchanged as required.

The invention claimed is:

1. A handle assembly, comprising:

a barrier member;

a handle arranged to be located on one side of the barrier member and having fixed thereto to at least one shaft member arranged to pass through a respective hole in the barrier member, the handle being arranged to pivot between a closed position, in which the handle is adjacent to the barrier member, and an open position, in which there is a gap between the handle and the barrier member; and a motor which is arranged to move the shaft member so as to move the handle assembly between the closed position and the open position, wherein the shaft member connects the handle to an inner plate, the inner plate connected to and moved by a plate spring connected to the motor.

2. A handle assembly according to claim 1, wherein there is a resilient element between the handle and the motor.

3. A handle assembly according to claim 1, wherein the plate spring is connected between and moved by two side arms which are connected to rotate with a spindle which is driven by the motor.

4. A handle assembly according to claim 3, wherein the side arms are attached to the spindle with a spline.

5. A handle assembly according to claim 3, wherein the inner plate is mounted on the spindle.

6. A handle assembly according to claim 3, wherein the plate spring is connected to each side arm at an end opposite from the spindle.

7. A handle assembly according to claim 6, wherein ends of the plate spring are located in a respective groove in each side arm.

8. A handle assembly according to claim 3, wherein the handle assembly is arranged to pivot the handle about an axis which is parallel to the spindle.

9. A handle assembly according to claim 1, wherein the handle assembly is arranged to pivot the handle about an axis which is perpendicular to the barrier member.

10. A handle assembly according to claim 1, wherein the motor is activated in response to a signal from a proximity sensor.

11. A handle assembly according to claim 10, wherein the proximity sensor is located on an external surface of the handle.

12. A handle assembly according to claim 1, wherein the shaft member is surrounded in the hole by a flexible grommet.

13. A tailgate liftglass for a vehicle, comprising:

a handle assembly, the handle assembly comprising:

a barrier member;

a handle arranged to be located on one side of the barrier member and having fixed thereto to at least one shaft member arranged to pass through a respective hole in the barrier member, the handle being arranged to pivot between a closed position, in which the handle is adjacent to the barrier member, and an open position, in which there is a gap between the handle and the barrier member; and a motor which is arranged to move the shaft member so as to move the handle assembly between the closed position and the open position, wherein the shaft member connects the handle to an inner plate, the inner plate connected to and moved by a plate spring connected to the motor, wherein the barrier member is a rear window of the vehicle.

14. A vehicle with a tailgate liftglass, comprising:

a handle assembly, the handle assembly comprising:

a barrier member;

a handle arranged to be located on one side of the barrier member and having fixed thereto to at least one shaft member arranged to pass through a respective hole in the barrier member, the handle being arranged to pivot between a closed position, in which the handle is adjacent to the barrier member, and an open position, in which there is a gap between the handle and the barrier member; and a motor which is arranged to move the shaft member so as to move the handle assembly between the closed position and the open position, wherein the shaft member connects the handle to an inner plate, the inner plate connected to and moved by a plate spring connected to the motor, wherein the barrier member is a rear window of the vehicle.

* * * * *